US007876334B2

(12) United States Patent
Bychkov et al.

(10) Patent No.: US 7,876,334 B2
(45) Date of Patent: Jan. 25, 2011

(54) PHOTOGRAPHY WITH EMBEDDED GRAPHICAL OBJECTS

(75) Inventors: Eyal Bychkov, Hod Hasharon (IL); Itzhak Pomerantz, Kfar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 364 days.

(21) Appl. No.: 11/395,224

(22) Filed: Apr. 3, 2006

(65) Prior Publication Data

US 2007/0057971 A1 Mar. 15, 2007

Related U.S. Application Data

(60) Provisional application No. 60/715,392, filed on Sep. 9, 2005.

(51) Int. Cl.
*G09G 5/00* (2006.01)
(52) U.S. Cl. .................. 345/629; 345/620; 345/621; 345/632
(58) Field of Classification Search ............ 345/632, 345/626, 629, 620, 621
See application file for complete search history.

(56) References Cited

U.S. PATENT DOCUMENTS

| 5,914,748 | A | * | 6/1999 | Parulski et al. ............. 348/239 |
| 6,166,744 | A | * | 12/2000 | Jaszlics et al. ............. 345/629 |
| 6,208,380 | B1 | * | 3/2001 | Misawa ................... 348/231.9 |
| 6,373,499 | B1 | * | 4/2002 | Acker ....................... 345/619 |
| 6,621,524 | B1 | * | 9/2003 | Iijima et al. ................. 348/584 |
| 7,053,953 | B2 | * | 5/2006 | Belz et al. ................... 348/346 |
| 2001/0055414 | A1 | * | 12/2001 | Thieme ...................... 382/135 |
| 2004/0135815 | A1 | * | 7/2004 | Browne et al. ............. 345/810 |
| 2005/0162520 | A1 | * | 7/2005 | Karasaki et al. .......... 348/207.2 |
| 2005/0195309 | A1 | * | 9/2005 | Kim et al. ................... 348/345 |
| 2005/0212817 | A1 | * | 9/2005 | Cannon et al. ............. 345/619 |
| 2005/0219384 | A1 | * | 10/2005 | Herberger et al. .......... 348/239 |

FOREIGN PATENT DOCUMENTS

WO WO 2005050975 A1 * 6/2005

OTHER PUBLICATIONS http://web.archive.org/web/20050619081056/http://www.exrx.net/Store/Other/Physigraphe.html; Jun. 19, 2005.*
Dayton et al. "Photoshop 5/5.5 Wow! Book", Peach Pit Press, 2000, p. 79, 80.*

* cited by examiner

*Primary Examiner*—Michelle K Lay
(74) *Attorney, Agent, or Firm*—Toler Law Group (57) ABSTRACT

A digital photography system and a method of its use. The system includes a digital camera having a mechanism for selecting a graphical object, a mechanism for superimposing the graphical object within a field of view of a digital camera, a mechanism for manipulating the graphical object within the field of view before capturing the image according to manipulation parameters that are set by a user and a mechanism for defining a relationship between the manipulated graphical object and at least part of the image. The scope of the invention also includes a memory card bearing such graphical objects and a method of offering the system for sale at a price that depends on the graphical objects stored in the memory card(s).

30 Claims, 12 Drawing Sheets

PHOTOGRAPHY WITH EMBEDDED GRAPHICAL OBJECTS

CROSS-REFERENCE TO RELATED APPLICATIONS

This patent application claims the benefit of U.S. Provisional Patent Application No. 60/715,392, filed Sep. 9, 2005

FIELD OF THE INVENTION

The present invention relates generally to the field of digital photography. More particularly, the present invention relates to modification of a photographed image by applying digital modification.

BACKGROUND OF THE INVENTION

Digital photography is a well-known art form that is used by millions of professional and amateur users to produce digital images of a selected scene or view.

Until recently, the digital camera's prime function was capturing images and manufacturers have mainly focused on increasing the performance of the digital photograph (e.g. increasing mega-pixel count, shortening boot-up time, shutter lag and shot-to-shot delay, offering more optical zoom lens choices, reducing power consumption, etc). Yet enhancement of the digital image, for either creative or corrective purposes, remained a post-exposure, post-download process dependent on secondary devices and photo-enhancement software for the PC.

Known in the art methods for enhancing the digital image include In-camera editing methods. This method can be applied to a range of image corrections, including contrast, noise, edge definition, blur and eliminating red-eye. Of these, red-eye correction is receiving the most attention.

Other approaches known in the art disclose digital cameras, which are limited to inserting and viewing a selected graphical object in predetermined areas of the field of view only and do not enable modification of the selected graphical object in relation with the field of view of a photographed image before the subject or field of view is captured.

Modification of a photographed image by digital manipulation is also well known, and can be performed using a wide variety of software programs. There is a special value in offering context-dependent graphical objects for enriching the photographed image in theme parks and other tourist-intensive sites, where "on site" photography is a popular part of the visitor experience.

Several methods known in the art apply manipulation of a digital image by inserting external graphic elements into the image. Such methods are enabled, among other means, by large libraries containing a variety of graphical objects, also known as "clipart", that are available from many software publishers.

However, such methods limit user flexibility, since users can only modify the digital photograph by adding the graphical elements after the image has been captured. This prevents the user from matching the graphical elements with the original scene by manipulating both of them. It leaves the photographed scene as given, such that the user is able to manipulate only the graphical elements, by way of on-board graphic editing of the image. As a result, many creative opportunities are missed as the user cannot manipulate the subjects or the field of view before the image is captured.

Therefore, there is a strong need to provide an easy-to-use system and method providing modification of photographed image by applying digital manipulation, such that the digital manipulation is applied before the image is captured in order to enable the user to view the image before it is captured and to verify that graphical objects are composed in relationship with the object in the scene.

SUMMARY OF THE INVENTION

Accordingly, it is a principal object of the present invention to overcome the disadvantages of prior art techniques used for photography with embedded graphical object.

The present invention discloses a system and method providing modification of an image within a subject or a field of view by applying digital manipulation before the image is captured.

The modification procedure is applied by superimposing graphical objects within the image. This allows embedded graphical objects to move and change their posture with relation to the subjects within the field of view, thus enriching the photographed image. In addition, the user is able to view the image before it is captured and verify that graphical objects are composed in relationship with the subjects in the scene.

The system utilizes a library containing a variety of graphical objects. The user is enabled to select graphical object and superimpose them within the image, thus enriching the photographed image.

In accordance with the present invention, there is provided a digital photography system including a digital camera that includes: (a) a mechanism for selecting at least one graphical object from a plurality of graphical objects; (b) a mechanism for superimposing the selected graphical object within a field of view of the digital camera; and (c) a mechanism for manipulating the selected graphical object within the field of view according to manipulation parameters that are set by a user before capturing an image of the field of view.

Preferably, the digital camera also includes a mechanism for defining a relationship between the manipulated graphical object and at least part of this image. The relationship may define the manner in which the manipulated graphical object is superimposed within the image. Alternatively, the relationship includes a link (i.e. a separate description of how the graphical object is superimposed on the image) between the manipulated graphical object and the image.

Preferably, the selected graphical object is superimposed within the image such that the image extends, at least partially, around the selected graphical object.

Preferably, the mechanism for manipulating is responsive to voice commands.

Preferably, the digital photography system also includes a memory for storing the graphical objects. More preferably, the memory is embedded in the digital camera. Also more preferably, the graphical objects are composed of a plurality of disjoint parts to create an illusion that a part of the graphical objects are hidden behind the field of view.

Preferably, the digital camera includes an interface for reversibly operationally attaching a memory card to the digital camera, wherein the graphical objects are stored in the memory card. More preferably, the digital camera further includes an authorization mechanism for verifying authorization of the memory card. Also more preferably, the graphical objects are stored in a format that is hidden (i.e. not accessible) to the user.

Preferably, the manipulation parameters include parameters for manipulating features such as color scheme, position, scale, rotation angle, etc.

Preferably, the digital camera further includes a mechanism for automatically eliminating parts of the graphical objects before capturing the image by applying image processing on the graphical objects in areas where the image is not in focus.

Preferably, the digital photography system further includes at least one memory card that includes: (a) a mechanism for storing the plurality of graphical objects; (b) a mechanism for storing a plurality of photographed images; and (c) a mechanism for storing, on the memory card, the relationship between the manipulated graphical object and at least part of the image.

In accordance with the present invention, there is further provided a method for creating a hybrid photograph, the method including the steps of: (a) selecting at least one graphical object from a plurality of graphical objects; (b) superimposing the selected graphical object within a field of view of a digital camera; and (c) manipulating the selected graphical object within the field of view according to manipulation parameters that are set by a user before capturing an image of the field of view.

Preferably, the method also includes the step of capturing the hybrid photograph as the image and a relationship between the manipulated graphical object and at least part of the image. The capturing step may either include storing the manipulated graphical object in superposition within the image. Alternatively, the capturing step includes storing the manipulated graphical object separately from the image, and defining a link between the manipulated graphical object and the image.

Preferably, the selected graphical object is superimposed within the image, such that the image extends, at least partially, around the selected graphical object.

Preferably, the manipulating step is effective responsive to voice commands.

Preferably, the method further includes the step of storing the graphical objects in a memory, such that the selection of the graphical object is effected by reading the graphical object from the memory. Most preferably, the graphical objects are composed of a plurality of disjoint parts to create an illusion that a part of the graphical objects are hidden behind the field of view.

Preferably, the method includes the step of reversibly operationally attaching a memory card to the digital camera, wherein the graphical objects are stored in the memory card. More preferably, the graphical objects are stored in a format that is not accessible to the user. Also more preferably, the method further includes the step of verifying authorization of the memory card.

Preferably, the manipulation parameters include parameters for manipulating features such as color scheme, position, scale, rotation angle, etc.

Preferably, the method further includes the step of automatically eliminating parts of the graphical objects, before capturing the image, by applying image processing on the graphical objects in areas where the image is not in focus.

In accordance with another embodiment of the present invention, there is further provided a memory card including: (a) a mechanism for storing a plurality of graphical objects; (b) a mechanism for storing a plurality of photographed images; and (c) a mechanism for storing, on the memory card, a relationship between at least part of a photographed image and a graphical object, such that the relationship is sufficient for displaying the graphical object superimposed within the photographed image upon downloading the photographed image to a hosting computer.

In accordance the present invention, there is further provided a method for doing business including the steps of: (a) providing a digital camera that enriches a photographed image of a field of view by superimposing a graphical object, selected from a plurality of graphical objects, that is manipulated by a user before capturing the photographed image; (b) configuring the digital camera to interface with a plurality of memory cards, each memory card bearing a respective plurality of graphical objects; and (c) offering the digital camera for sale along with at least one memory card at a price that depends on the graphical objects stored in the memory card.

Additional features and advantages of the invention will become apparent from the following drawings and description.

BRIEF DESCRIPTION OF THE DRAWINGS

For a better understanding of the invention with regard to an embodiment thereof, reference is made to the accompanying drawing, in which like numerals designate corresponding sections or elements throughout, and in which.

DETAILED DESCRIPTION OF THE PREFERRED EMBODIMENTS

The present invention discloses a digital photography system and method providing modification of a graphical object superimposed within a field of view by applying digital manipulation before capturing an image of the field of view.

The method of the present invention manipulates at least one graphical object, selected from a plurality of graphical objects, within the field of view of a digital camera before capturing the image. The manipulation is applied to the graphical object itself, in relation within the field of view, before capturing the image according to manipulation parameters that are set by a user. The manipulation parameters are stored along with a relationship defined between the manipulated graphical object and at least part of the photographed image. According to the method of the present invention, the manipulated graphical object is then superimposed within the image for enriching the photographed image.

The modification procedure is applied by superimposing graphical objects within the field of view before capturing the image. This allows embedded graphical objects to move and change their posture with relation to the subjects within the image, thus enriching the photographed image. In addition, the user is able to view the image before it is captured and verify that graphical objects are composed in relationship with the subjects in the scene.

Typically, the graphical objects are placed in front of the scene, so that the scene is partially hidden (i.e. not accessible to the user). However, the graphical objects can be further superimposed within a subject or a field in view before capturing the photographed image in a non-contiguous manner, thus exposing parts of the scene in between parts of the graphical objects. Such a digital manipulation creates the effect that the graphical object is partially hidden behind subjects in the scene, such that the graphical object is not accessible to the user.

The digital manipulation that is applied on the graphical objects before capturing the image include directing a digital camera's control keys or voice commands to shift, scale, or rotate the graphical objects within the photographed image. The control keys can either be additional keys implemented within the digital camera or can be the digital camera's existing dedicated control keys working in an additional mode.

The present invention is based on an ordinary digital camera, such as the A85 camera available from Cannon Japan or many other camera models supporting digital photography. However, the present invention is not limited to a specific type of camera, and can be implemented in a disposable camera or a rental camera, or in any widely branded personal camera as an extra feature to be used when desired.

These cameras typically contain a memory card (e.g. flash memory card) that is designed to accept the captured images and enable users to download them for viewing, storing or processing.

The digital photography system, in accordance with a preferred embodiment of the present invention, utilizes a library containing a variety of graphical objects. The user is enabled to select graphical object and superimpose them within the photographed image, thus enriching the photographed image.

The graphical objects stored in the library are optionally composed of a plurality of disjoint parts to create an illusion that a part of the graphical objects are hidden behind the field of view.

The library can be either embedded within the camera's memory or implemented within a detachable memory card. By configuring the present invention as a content-dependent system, i.e. implementing the library within a detachable memory card, it is possible to plug a customized memory card into the system containing mainly graphical objects that are associated with the given scene or context.

The digital photography system is provided for superimposing a graphical object(s) within a field of view before capturing the image. One way to capture the photograph is by storing the graphical object in superposition with the photographed image, such that the graphical object is merged within the image.

Another option is to store the photographed image separately from the graphical objects. According to such method, the manipulation parameters relating to the superposition of the graphical object are stored as a separate file containing metadata for execution upon the download of the images to a computer. The metadata defines the link between the photographed image and the selected graphical objects and contain the manipulation parameters made by the user to the graphical objects (size, location, color). Storing only a link of the graphical object (and not a full-size graphical object) for each photographed image has the benefit of lower storage consumption. This method does not change the original photographed image, thus allowing the user to choose between the raw photo and the modified photo.

Definitions

"Field of view" is what a camera sees within its frame (typically a rectangle with aspect ratio of 3×4), after the user has adjusted the pan, tilt and zooms.

The term "graphical object" is used, in the present invention, to describe an artistic graphical representation of a figure or object that can be embedded within a field of view before capturing the image of the field of view, so that the field of view extends, at least partially, around the graphical object. The term "graphical object" does not apply to decorative frames that circumscribe the image. This distinction is material, as the position of a decorative frame around the field of view is fixed and is not related to the location of the field of view, while the location of "graphical objects" of the present invention in the field of view is meant to be variable, controlled by the user, and defined in strong relationship to the location of the field of view. The present invention is not related to decorative frames.

"Manipulate" is an operation of changing any of color scheme, horizontal position, vertical position, horizontal scale, vertical scale, and rotation of the graphical objects. The manipulation is applied to the graphical object itself, in relation with the field of view, before capturing the image. In other words, the user can fix the field of view viewed by the camera to some fixed horizontal direction, vertical direction and zoom factor and then move, or otherwise manipulate, a graphical object within that field of view. The term "manipulate" does not include the changing of the camera's field of view (direction and/or zoom factor) in order to have a graphical object, having a fixed location and a fixed size within the field of view, to achieve a desired relation to the field of view.

"Manipulation parameters" identify the graphical objects, the parameters of manipulation, and the parameters of color modification.

Figure 1:
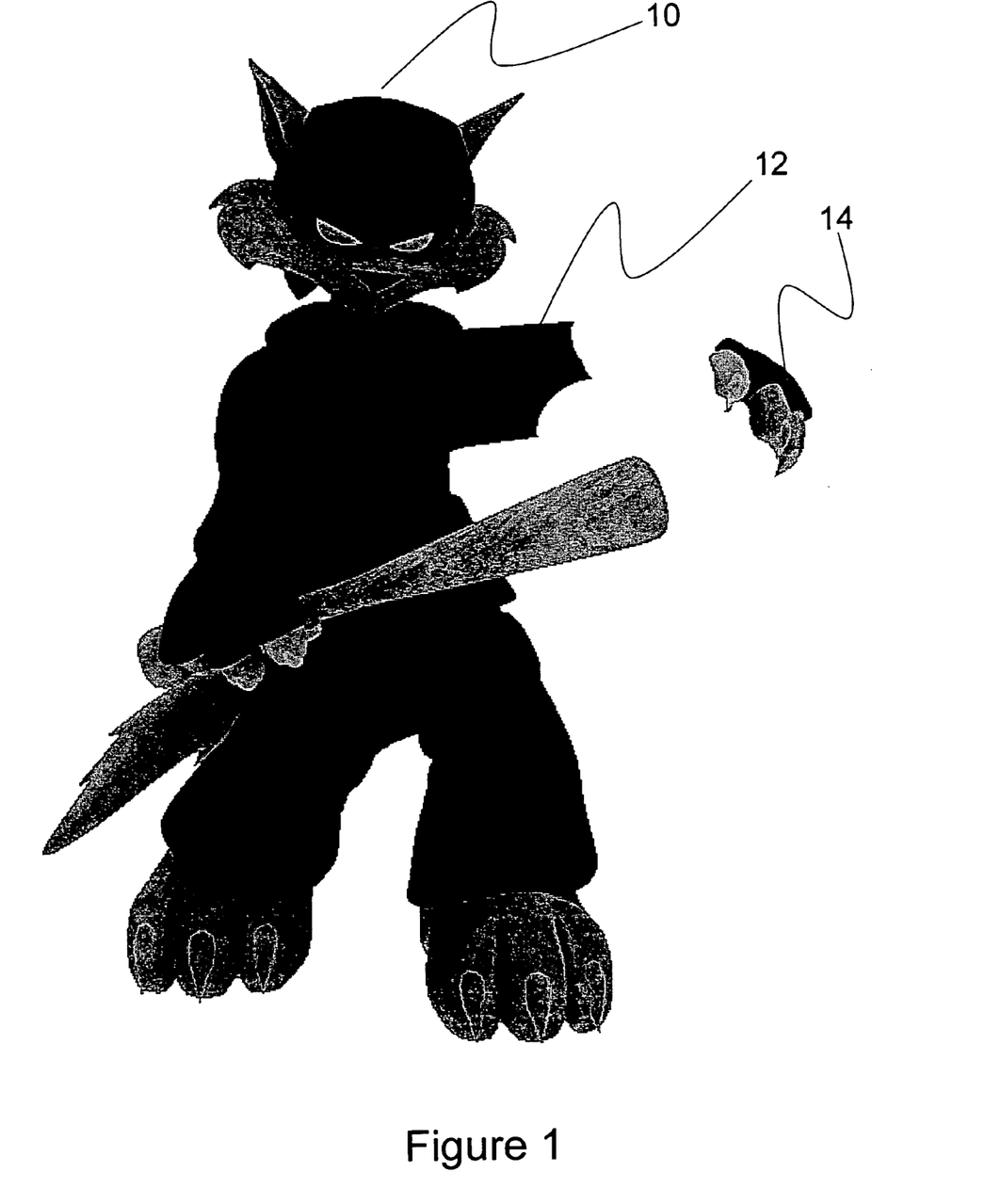
FIG. 1 is an illustration of a graphical object that is stored in a portable memory.

Referring now to FIG. 1, there is shown an illustration of a graphical object 10 that is stored in a portable memory. The graphical object 10 comprises two non-contiguous parts 12 and 14. The gap between the two parts 12 and 14 is cut in the general shape to fit the shoulders and neck of a human being. The graphical object 10 can be manipulated in every manner using the camera's control keys to customize the graphical object 10 in relation with the human being and to merge the graphical object 10 within the field of view before capturing the image. The graphical object 10 can be horizontally and vertically shifted in the photographed image, can be flipped over (reflected and/or rotated), and also can be scaled up and down in size in each of the two dimensions separately.

Figure 2:
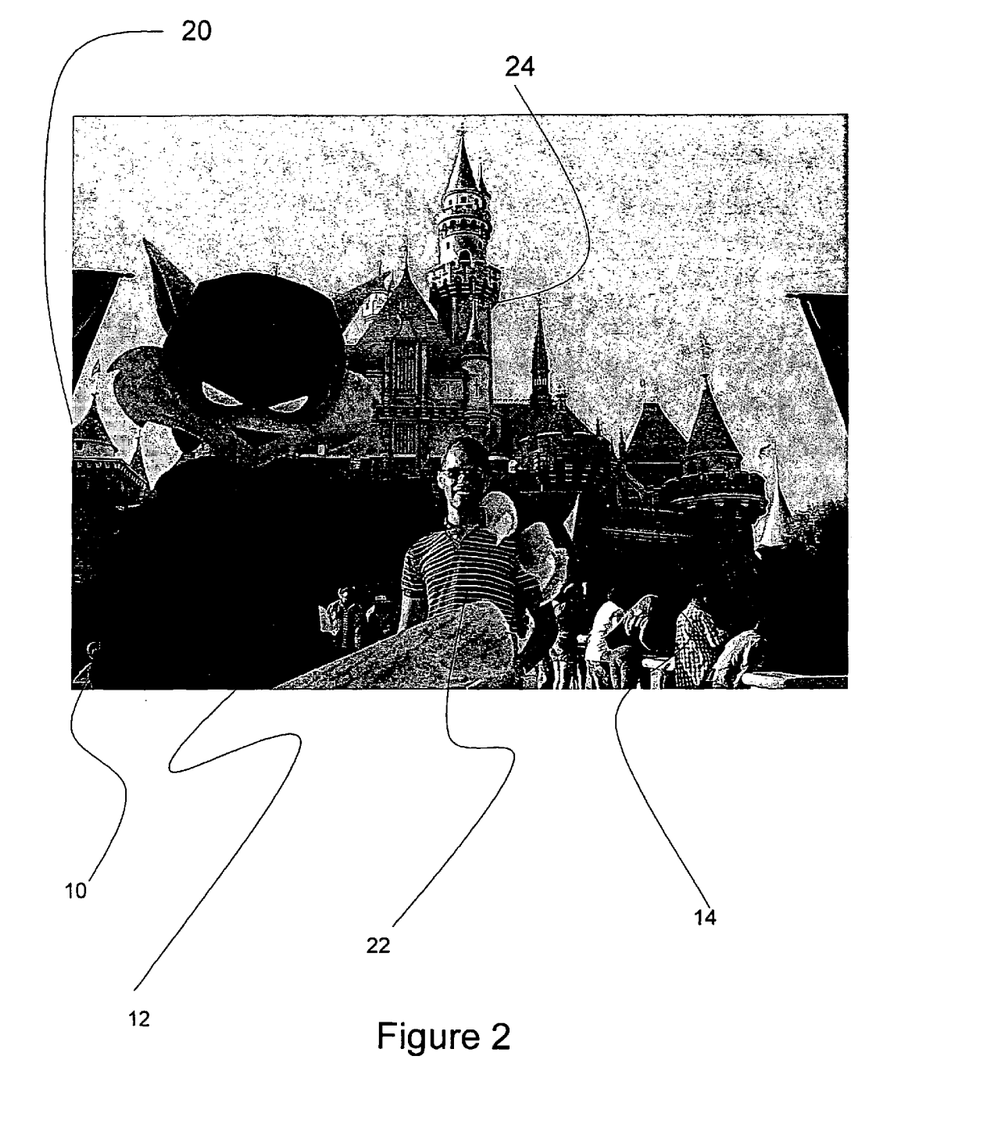
FIG. 2 is a photograph of the graphical of FIG. 1 superimposed with a person standing in front of a theme park building.

Referring to FIG. 2, there is shown a field of view 20 including graphical object 10 of FIG. 1 superimposed with a person 22 standing in front of a theme park building 24. The person 22 in the photographed image is positioned between the two non-contiguous parts 12 and 14 of the graphical object 10. Superimposing the graphical object 10 within the field of view 20 achieves the visual effect that the graphical object 10 is a part of the scene, and is hugging the person 22.

Figure 3:
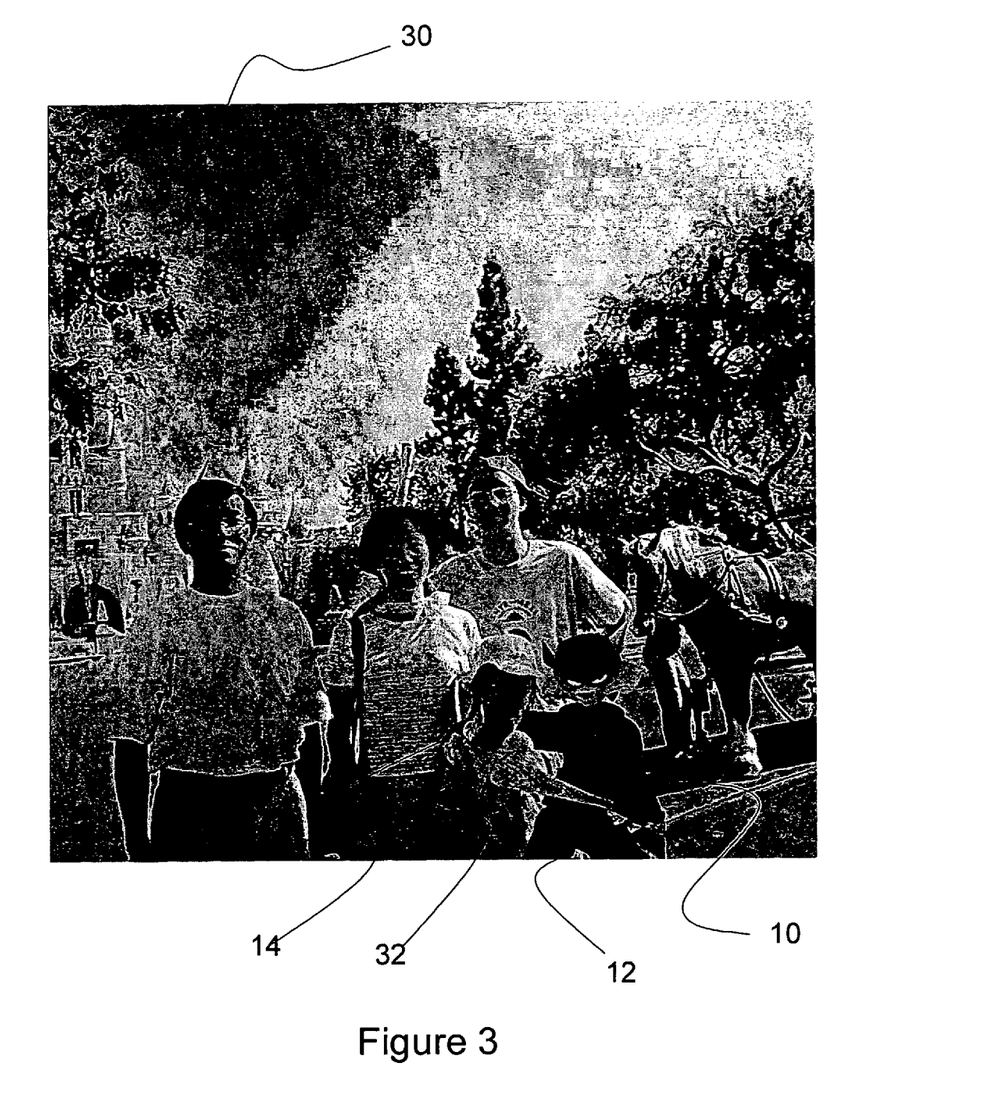
FIG. 3 is another photograph of the graphical of FIG. 1 superimposed with people posing in front of the camera.

Referring to FIG. 3, there is shown another field of view 30 including graphical object 10 of FIG. 1 superimposed with people posing in front of the digital camera. The graphical object 10 is shifted to a different location, and is manipulated to enable a girl 32 to be posed between the two non-contiguous parts 12 and 14 of the graphical object 10.

Figure 4:
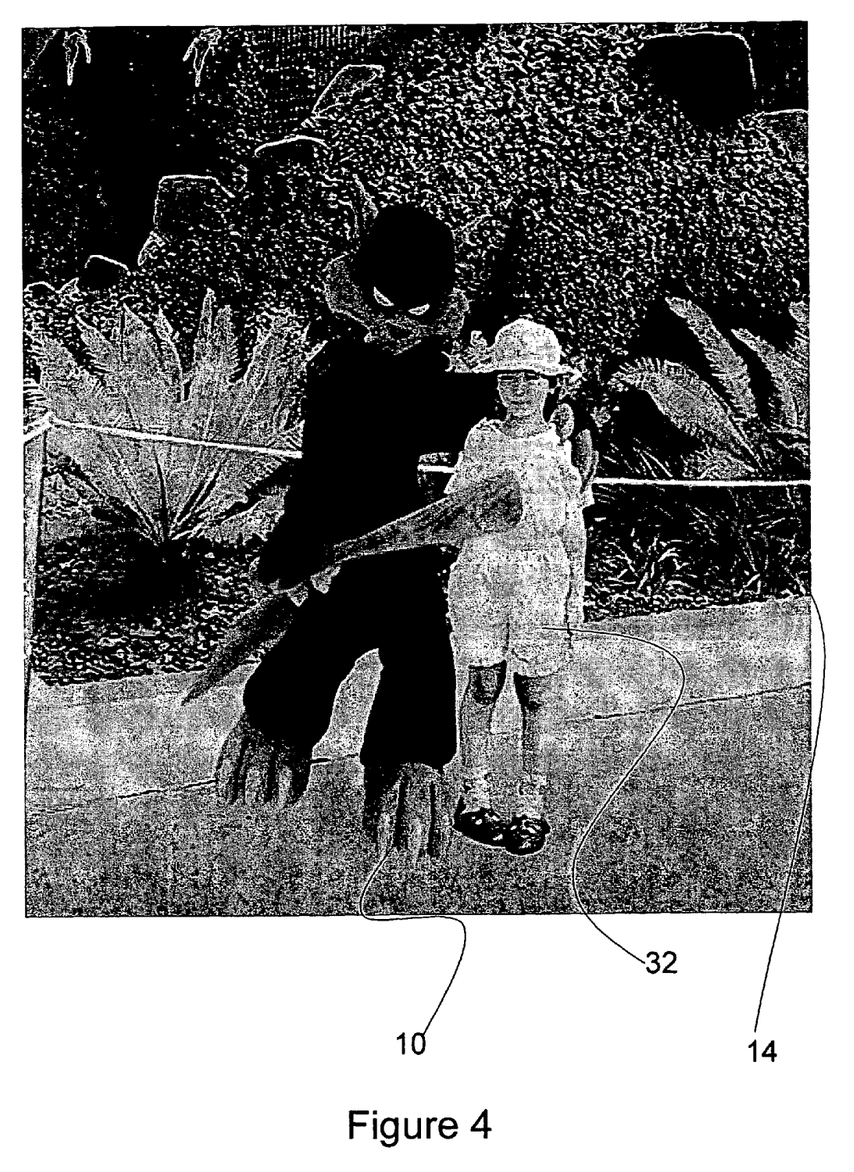
FIG. 4 is another photograph of the two non-contiguous parts of graphical of FIG. 1 superimposed with a girl.

Referring to FIG. 4, there is shown another field of view 40, with the two non-contiguous parts 12 of graphical object of FIG. 1 superimposed with a girl 32. It should be noted, that the graphical object 10 has been un-evenly scaled to become narrower, in order to narrow the gap between the two parts and fit the shoulders of the girl 32. Even scaling would make the graphical object 10 shorter, not suitable for the height of the girl 32.

Figure 5:
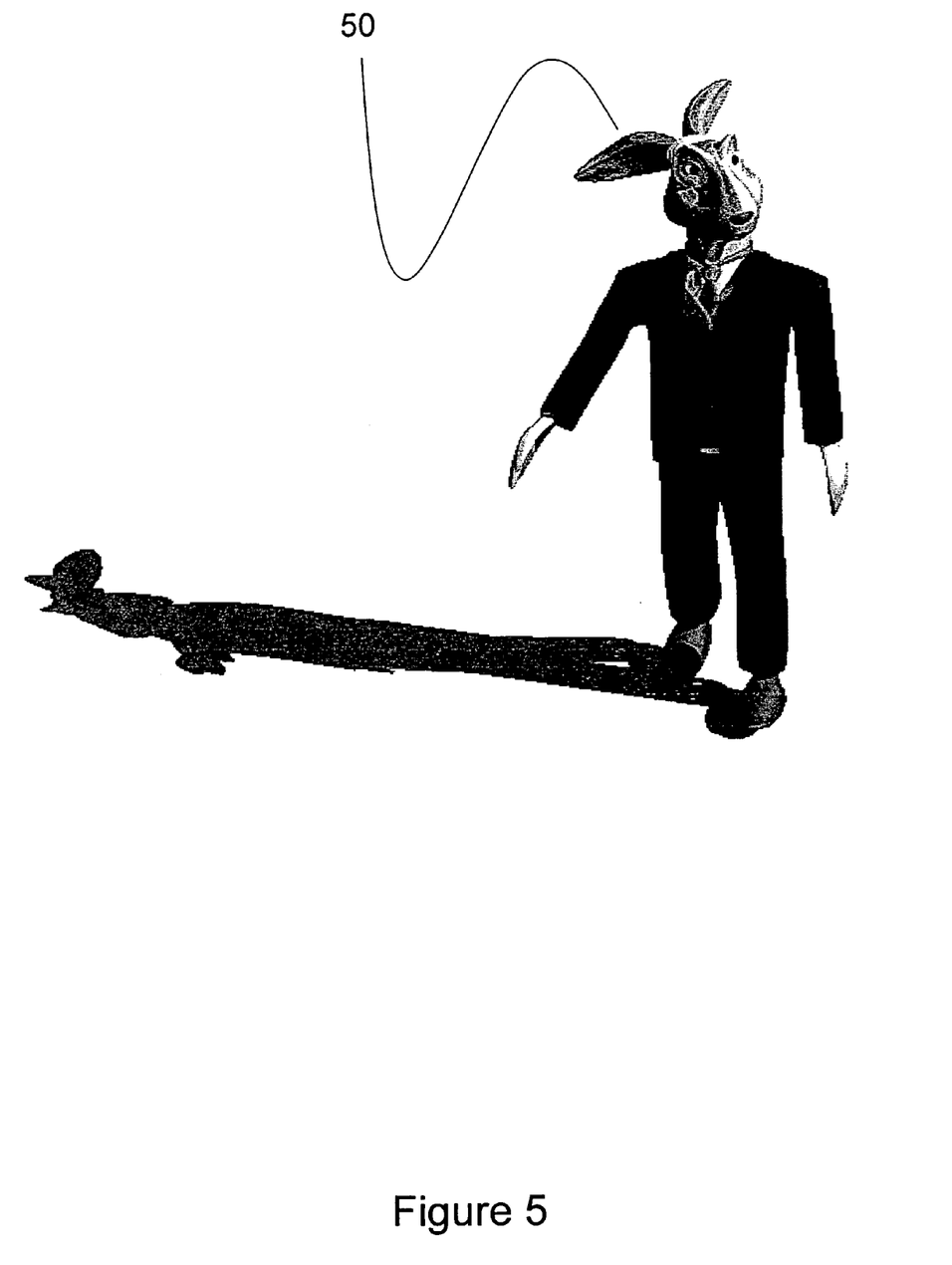
FIG. 5 is another illustration of a graphical object stored in the memory card.

Referring to FIG. 5, there is shown another illustration of a graphical object 50 stored in the memory card.

Figure 6:
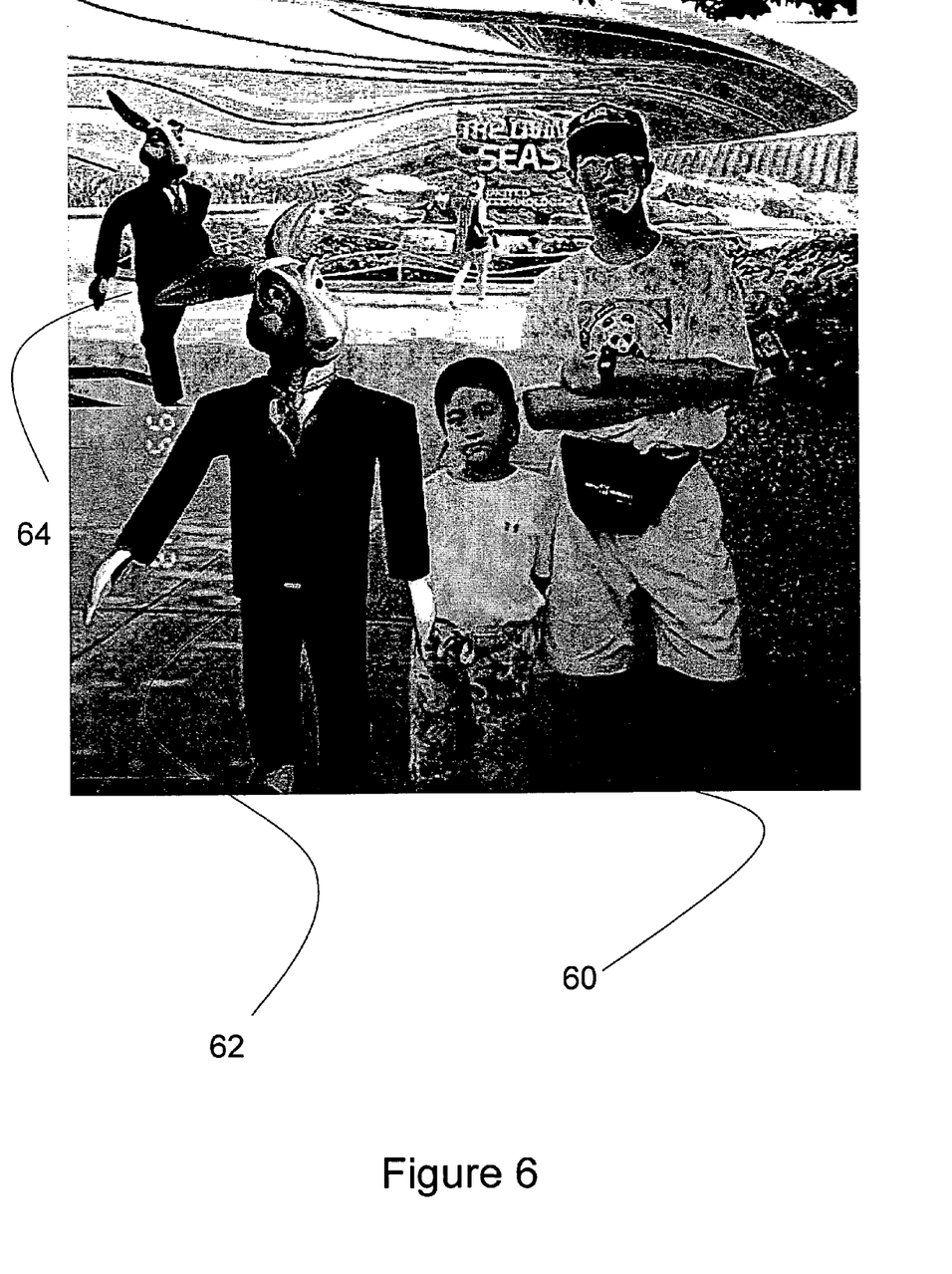
FIG. 6 is a photograph of the two graphical objects of FIG. 5 superimposed within the photographed image.

Referring to FIG. 6, there is shown a field of view 60 with graphical object 50 of FIG. 5 superimposed within the field of view 60 as graphical objects 62 and 64. The two graphical objects 62 and 64 are located and scaled to create the visual impression that they are a realistic part of the scene.

Figure 7:
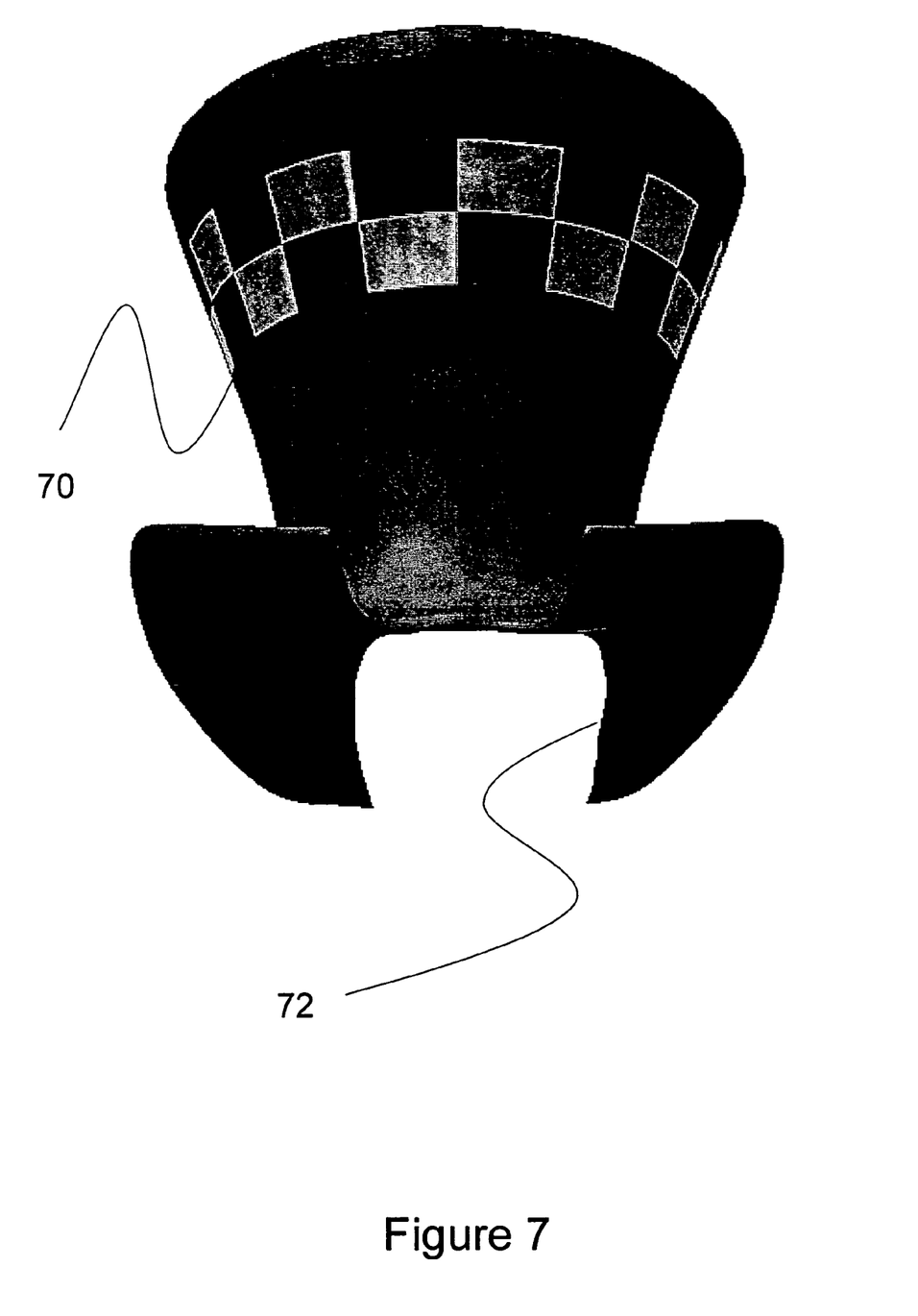
FIG. 7 is an illustration of a decorative hat having a missing part at the bottom.

Referring to FIG. 7, there is shown an illustration of a decorative hat 70 having a missing part 72 at the bottom.

Figure 8:
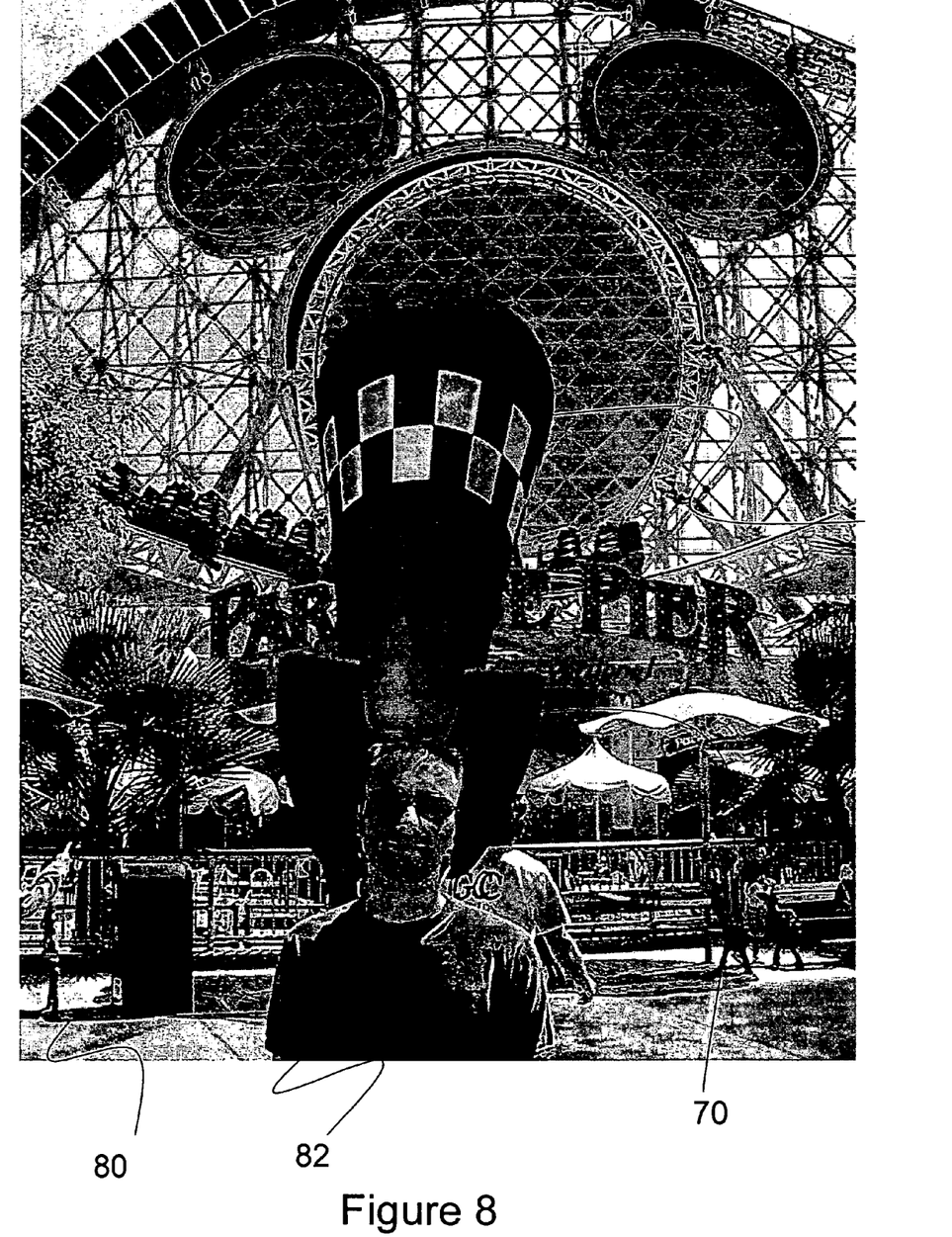
FIG. 8 is a photograph of the graphical object from FIG. 7 superimposed with a person in the scene, such that the missing part is positioned and scaled to encircle the person's head.

Referring to FIG. 8, there is shown a field of view with graphical object 70 from FIG. 7 superimposed with a person 82 in the scene, such that the missing part 72 is positioned and scaled to encircle the person's head. Thus, a visual impression of a person 82 wearing a huge hat 70 is obtained.

Figure 9:
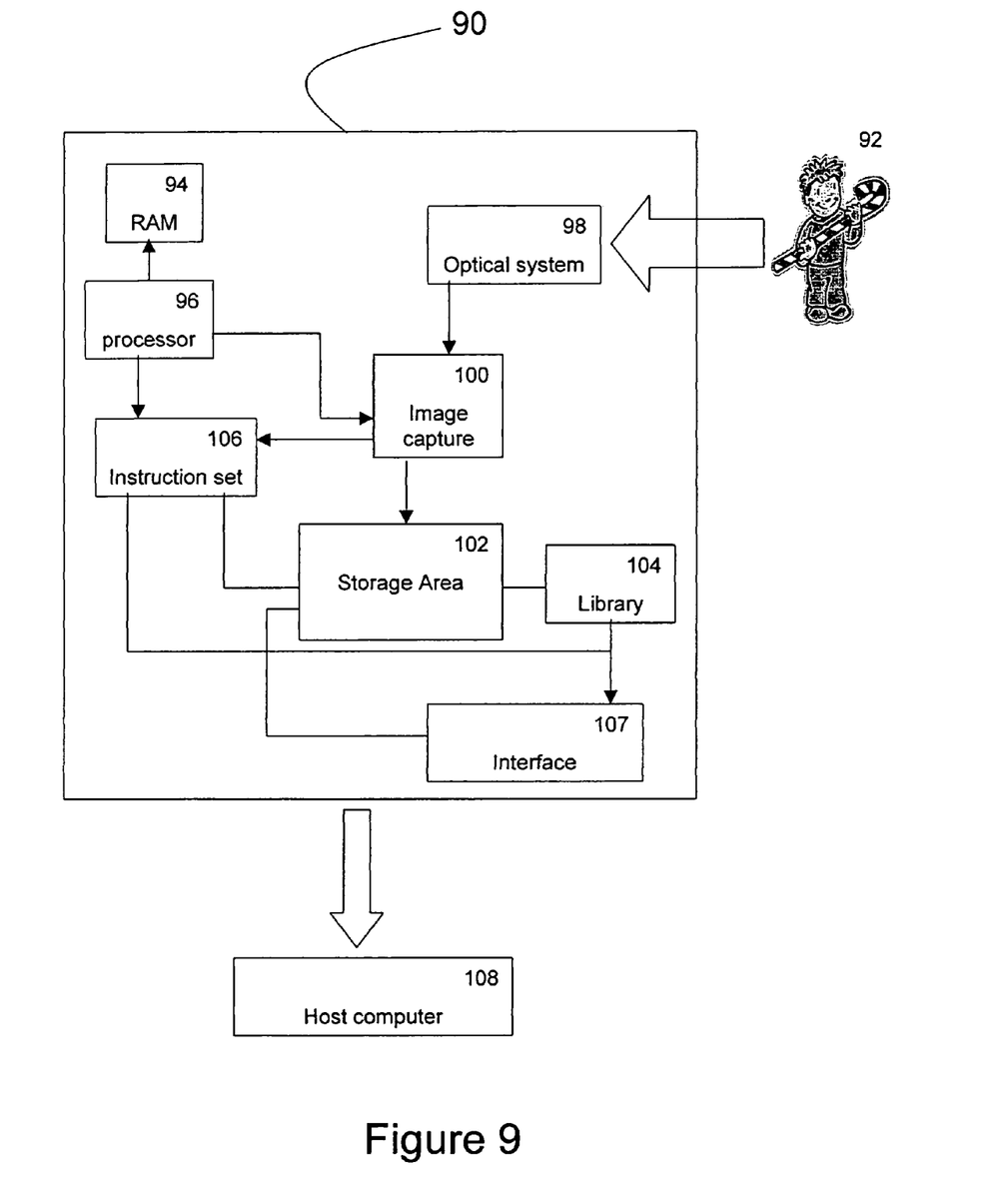
FIG. 9 is a block diagram of the modules implemented within the digital photography system of the present invention.

Referring to FIG. 9, there is shown a block diagram of the modules implemented within the digital camera 90 of the present invention. The digital camera 90 is provided to capture an image of a graphical object that is superimposed on a field of view 92 and display the photographed image on a Host computer 108.

The Digital camera includes a RAM (Random Access Memory) 94 and a processor 96 for managing the digital camera 90 and interfacing with a hosting device (such as the Host computer 108 or a memory card).

An Optical system 98 is provided for receiving light from the subject 92 and focusing the light as an optical image on an Image capture device 100.

The Image capture device 100 captures the optical image and converts it to a digital file.

A storage area 102 connected to the Image capture device 100 is provided for storing the photographed image, such that the photographed image is stored along with the relationship of the manipulated graphical object/s. One way is storing the manipulated graphical object/s superimposed within the photographed image. Another way is storing the graphical object/s separately from the photographed image, such that the photographed image is stored with the manipulation coordinate parameters of the manipulated graphical objects.

In accordance with a preferred embodiment of the present invention, a library 104 containing a variety of graphical objects is stored in a read-only part of digital camera 90. These graphical objects are superimposed within the photographed image, thus enriching the photographed image.

Instruction set module 106 applies a graphical manipulation to the original graphical object (stored in library 104) with relation to a photographed image. Manipulation parameters regarding the graphical manipulation and a relationship between the manipulation parameters and at least part of the original graphical object are then stored in storage area 102, whereas the original graphical object is not modified (is stored as-is for later usage). The Instruction set module 106 may be operated using control keys of the digital camera that also have other functions, or using control keys that are added to the digital camera 90 for this purpose. The Instruction set module 106 may further be responsive to voice commands.

An Interface unit 107 is provided for reversibly operationally attaching a memory card (see FIG. 10) to said digital camera 90.

Figure 10:
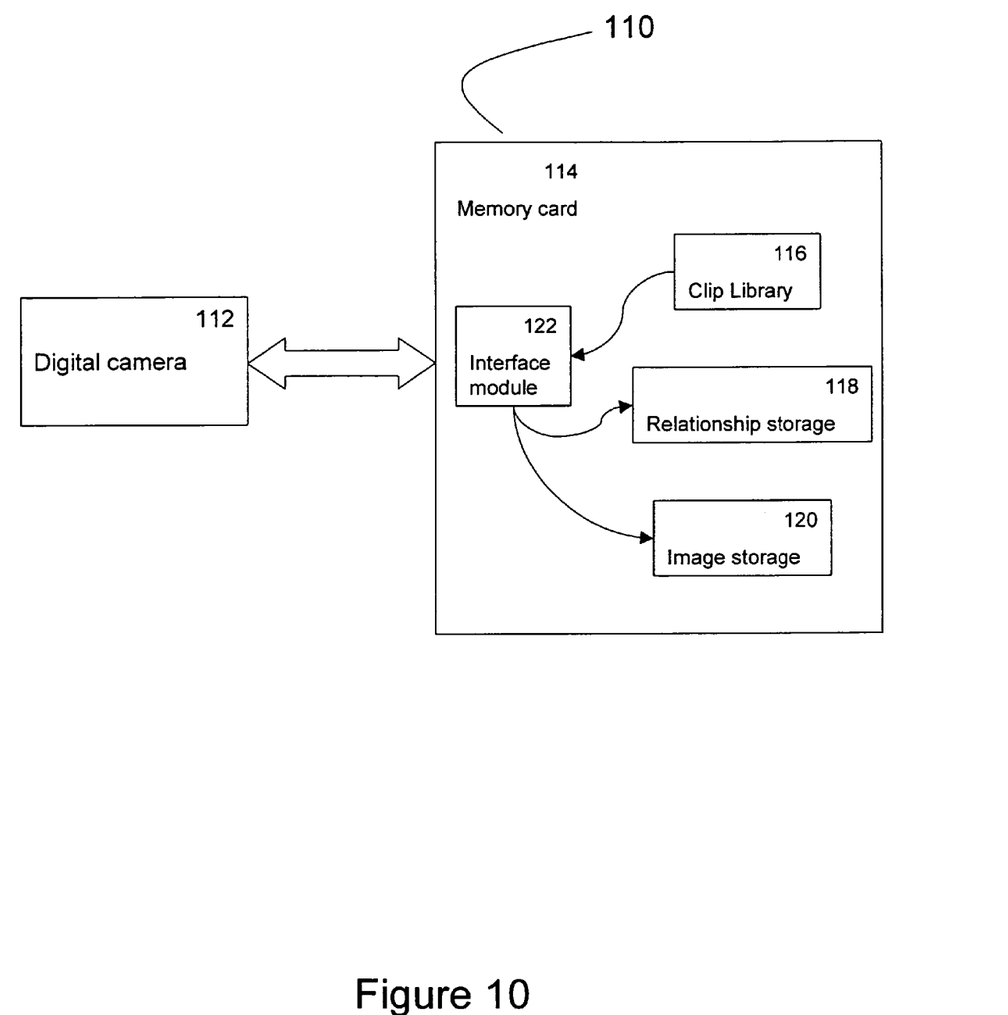
FIG. 10 is a block diagram of the memory card of the present invention.

Referring to FIG. 10, there is shown a block diagram 110 of the memory card of the present invention. Memory card 114 includes a Clip library 116 for storing a plurality of graphical objects and an Image storage 120 for storing a plurality of photographed images.

A Relationship storage 118 is further provided for storing, on the memory card, a relationship between at least part of a photographed image and a graphical object. The relationship may be either a separate description, linking to a corresponding graphical object, of the manner in which the graphical object is superimposed on the photographed image or a storage including a combined image of both the graphical object and at least part of the photographed image. The relationship is sufficient for displaying said at least one graphical object superimposed within a photographed image upon a downloading the memory card to a hosting computer.

An Interface module 122 is provided for interfacing with a digital camera 112.

Figure 11:
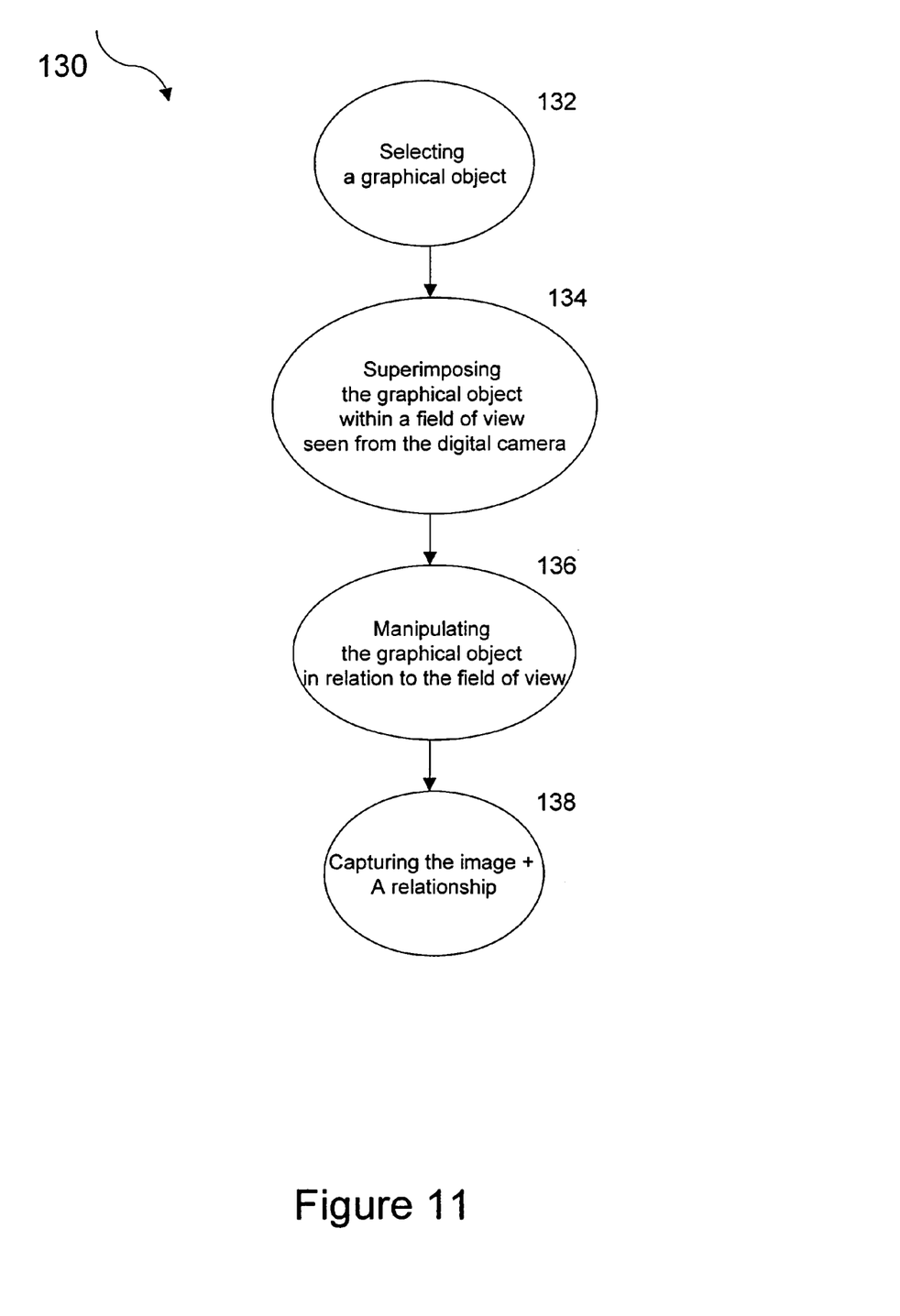
FIG. 11 is a flow chart of a method of the present invention for taking a photo according to the present invention.

Referring to FIG. 11, there is shown a flow chart 130 of taking a photo according to the present invention.

At the initial step 132, the user selects a graphical object/s from among a plurality of graphical objects that are stored within the digital camera or a memory card. At the next step 134, the user superimposes the selected graphical object within a desired field of view that is seen from the digital camera. At the next step 136, the user manipulates the graphical object within the field of view, thus creating the desired effect (e.g. "hugging part"). At the last step 138, the user captures the photographed image along with the relationship between the manipulated graphical object and the photographed image itself.

Figure 12:
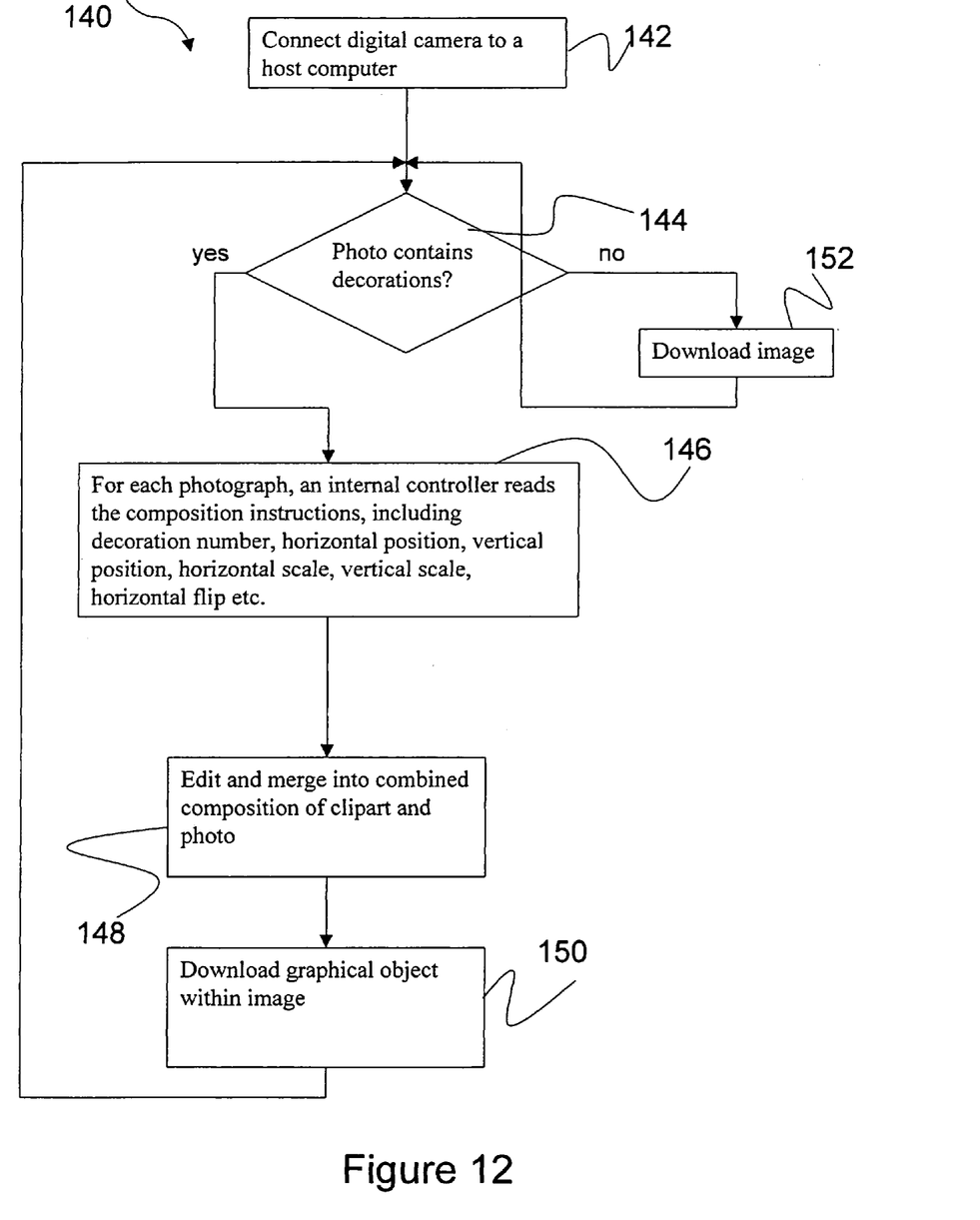
FIG. 12 is a flow chart of a method of the present invention for capturing a photographed image in which manipulation parameters are stored separately from the photographed image.

Referring to FIG. 12, there is shown a flow chart 140 a method of the present invention for capturing a photographed image in which manipulation parameters relating to the graphical object are stored separately from the photographed image.

At the initial step 142, the user connects the digital camera to a computer, or plugs a memory card into a reader that is connected to a computer.

The next steps (144 to 152) are applied for each photographed image in the memory card separately.

At step 144, the system checks whether there is a graphical object linked to the specific photographed image. In the affirmative case, the manipulation parameters regarding the linked graphical object/s are retrieved from the photo file on the memory card (step 146).

At step 148, the system then superimposes the linked graphical object/s within the photographed image, according to the manipulation parameters.

At step 150, the photographed image is downloaded into the host computer, such that the linked graphical object/s is superimposed within the photographed image. Steps 144 to 152 are then repeated for the next photographed image.

In the negative case (step 152), i.e. if a graphical object/s is not linked to the photographed image or the superimposed graphical object is stored together with the photographed image, the system downloads the photographed image into the host computer as is. Steps 144 to 152 are then repeated for the next photographed image.

In accordance with another embodiment of the present invention, the system may further comprise a mechanism for automatically applying image processing on the graphical object when superimposed within the photographed image. Such image processing is operative to detect a distinction between a focused area and an unfocussed area of said photographed image.

For example, as a person in the photographed image is typically in sharp focus, the background behind the person is typically slightly out of focus and blurred. Thus, automatic image processing may be applied on the "hugging part" of the graphical object (i.e. the part of the graphical object that is meant to be partially hidden by the subjects within the photographed image—in the illustrated examples, the arm of the graphical object hugging the subject) for removing pixels of the "hugging part" that are superimposed within a sharply focused area of the photographed image. The image processing is further applied for keeping the pixels of the "hugging part" that are covering blurred areas of the photographed image. All other parts of the graphical object (that are not the "hugging part" thereof) are kept, disregarding the sharpness of the background.

In accordance another embodiment of the present invention, the digital photography system may be configured to protect data in the library that is protected by the copyright of a publisher by storing the data on a memory card in a format that is not readable by a user using conventional software. The protection can be obtained by implementing the library in a non-mapped area of the memory card's storage area. This limits the reading and usage of the graphical objects to proprietary commands only. Protection can be further obtained by encrypting the library, such that decryption is enabled only by proprietary command, requiring authentication (like a password) for entering the library, etc.

In accordance with yet another embodiment of the present invention, the digital photography system may be configured as a challenge-response system to perform an authorization check of the memory card, in order to protect the card vendor from distribution of piratical memory cards and ensure that the memory card is authorized. Upon activation of the digital camera, according to a standard challenge-response system, a random challenge number is sent to the memory card. The processor 96 (see FIG. 9) calculates a response number, which is a function of the challenge number, and a secret number, which is embedded in the memory card. The digital camera ensures the authorization of the memory card by verifying whether the response number is valid. However, other authorization methods can be used.

Another method of the present invention is a method for doing business. The method includes provides a digital camera that enriches the photographed image by superimposing a graphical object within the photographed image, such that the photographed image extends, at least partially, around the graphical object. The graphical object is selected by a user from a plurality of graphical objects. The method further enables the user to manipulate the selected graphical object within the photographed image according to manipulation parameters that are set by this user. The digital camera is then offered for sale along with at least one memory card at a certain price. The prices of the digital cameras differ from one digital camera to another, depending on the number of graphical objects provided in the memory card, the type of graphical objects provided, etc.

It can be understood that other implementations are possible within the scope of the invention, thus relating to any system and method providing digital manipulating within a subject or an image before the picture is captured.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A digital photography system comprising:
   a mechanism for selecting at least one graphical object from a plurality of graphical objects;
   a mechanism for superimposing said selected at least one graphical object within a field of view of said digital photography system;
   a mechanism for manipulating said selected at least one graphical object within said field of view with relation to a subject in said field of view according to manipulation parameters that are set by a user before capturing an image of said field of view;
   a mechanism for capturing the image of said field of view to form a captured image of said field of view;
   a mechanism for storing the manipulated at least one graphical object separately from the captured image of said field of view, wherein the captured image of said field of view is stored with the manipulation parameters of the at least one graphical object; and
   a mechanism allowing a user to choose between displaying the captured image of said field of view and displaying a hybrid image including the manipulated at least one graphical object combined with the captured image of said field of view.

2. The digital photography system of claim 1, further including a mechanism for defining a relationship between said manipulated at least one graphical object and the subject.

3. The digital photography system of claim 2, wherein said relationship is that said manipulated at least one graphical object is superimposed within said captured image.

4. The digital photography system of claim 2, wherein said relationship includes a link between said manipulated at least one graphical object and said captured image, wherein the link comprises metadata including the manipulation parameters.

5. The digital photography system of claim 2 further comprising:
   at least one memory card that includes:
      a mechanism for storing said plurality of graphical objects;
      a mechanism for storing a plurality of photographed images; and;
      a mechanism for storing, on said at least one memory card, said
         relationship between said manipulated at least one graphical object and a least a part of said captured image.

6. The digital photography system of claim 1, wherein said mechanism for manipulating is responsive to voice commands.

7. The digital photography system of claim 1 further comprising:
   a memory for storing said plurality of graphical objects.

8. The digital photography system of claim 7, wherein said memory is embedded in said digital photography system.

9. The digital photography system of claim 7, wherein at least one of said plurality of graphical objects is composed of a plurality of disjoint parts to create an illusion that a part of said at least one graphical object is hidden behind said field of view.

10. The digital photography system of claim 1, further comprising an interface for reversibly operationally attaching a memory card, wherein said plurality of graphical objects are stored, to said digital photography system.

11. The digital photography system of claim 10, further comprising an authorization mechanism for verifying authorization of said memory card.

12. The digital photography system of claim 10, wherein said plurality of graphical objects are stored in a format that is hidden from said user.

13. The digital photography system of claim 1, wherein said manipulation parameters include parameters for manipulating at least one feature including any one of color scheme, position, scale, and rotation angle.

14. The digital photography system of claim 1 which is a digital camera.

15. The digital photography system of claim 1, further comprising a mechanism for displaying said selected at least one graphical object superimposed within said field of view automatically eliminating parts of said plurality of graphical objects before capturing said image of said field of view by:
   automatically identifying at least one area where the subject within said field of view is in focus;
   automatically applying image processing on said selected at least one graphical object where a first portion of said selected at least one graphical object is not displayed in said at least one area where said subject within said field of view is in focus;
   automatically identifying at least one area where said subject within said field of view is out of focus; and
   automatically applying image processing on said selected at least one graphical object where said subject within said field of view is out of focus, wherein a second portion of said selected at least one graphical object is displayed in said at least one area where said subject within said field of view is out of focus.

16. A method for creating a hybrid photograph, the method comprising:
   in a digital photography system including a processor and a memory storing a plurality of graphical objects:
      selecting with the processor at least one graphical object from the plurality of graphical objects;
      superimposing said selected at least one graphical object within a field of view of the digital photography system;
      manipulating said selected at least one graphical object within said field of view with relation to a subject in said field of view according to manipulation parameters that are set by a user before capturing an image of said field of view;
      capturing the image of said field of view to form a captured image of said field of view;
      storing the manipulated at least one graphical object separately from the captured image of said field of view, wherein the captured image of said field of view is stored with the manipulation parameters of the at least one graphical object;
      after storing the manipulated at least one graphical object and storing the captured image of said field of view, receiving a user selection choosing between a raw photo and a modified photo; and
      selectively displaying one of the captured image of said field of view and a hybrid image including the manipulated at least one graphical object combined with the captured image of said field of view in response to the user selection.

17. The method of claim 16 further comprising storing a relationship between said manipulated at least one graphical object and the subject.

18. The method of claim 17, wherein the relationship includes a link between said manipulated at least one graphical object and said subject, wherein the link comprises metadata including the manipulation parameters.

19. The method of claim 16, further comprising:
   displaying the hybrid image of said at least one graphical object combined with said field of view by:
      automatically identifying at least one area where the subject within said field of view is in focus;
      automatically applying image processing on said selected at least one graphical object where the subject is displayed within said at least one area where the subject is in focus; and
      automatically applying image processing on said selected at least one graphical object where the subject is out of focus, wherein a portion of said selected at least one graphical object is displayed in at least one area where the subject is out of focus.

20. The method of claim 16, wherein said superimposing of said selected at least one graphical object within said captured image extends, at least partially, around said selected at least one graphical object.

21. The method of claim 16, wherein said manipulating is effected in response to voice commands.

22. The method of claim 16 further comprising:
   storing said plurality of graphical objects in a memory, such that said selecting is effected by reading said at least one graphical object from said memory.

23. The method of claim 22, wherein at least one of said plurality of graphical objects is composed of a plurality of disjoint parts to create an illusion that a part of said at least one graphical object is hidden behind said field of view.

24. The method of claim 16, wherein the digital photography system is a digital camera.

25. The method of claim 24 further comprising:
   verifying authorization of a memory card that is reversibly operationally attached to the digital camera, and wherein said plurality of graphical objects are stored at the memory card.

26. The method of claim 16, wherein said manipulation parameters include parameters for manipulating at least one feature including any one of color scheme, position, scale, and rotation angle.

27. A memory device comprising:
   a memory region including:
      a clip library to store a plurality of graphical objects, wherein the clip library is accessible by a digital photography system via the interface to enable selection of a graphical object to be superimposed within a field of view of the digital photography system and to enable the selected graphical object to be manipulated using manipulation parameters that indicate a position within said field of view with relation to a subject in said field of view; and
      storage to store data representing said field of view when the digital photography system captures an image of said field of view and to store the manipulated graphical object separately from the captured image of said field of view, wherein the captured image of said field of view is stored with the manipulation parameters; and
   an interface coupled to the memory region, the interface configured to enable a host computer to access the memory region and to selectively display a hybrid image of the manipulated graphical object combined with the captured image of said field of view and to selectively display the captured image of said field of view in response to a user selection.

28. The memory device of claim 27, wherein the memory device comprises a removable nonvolatile memory device.

29. The memory device of claim 27, wherein the interface is further configured to enable the host computer to access the clip library and the storage to enable the host computer to display the hybrid image.

30. The memory device of claim 27, further comprising:
a controller coupled to the memory region, wherein the controller enables the host computer to retrieve data representing the selected graphical object, the data representing the captured image of said field of view, and the data representing a position of the selected graphical object within the captured image of said field of view and enabling the host computer to display the hybrid image, wherein:
at least one first area where the subject is in focus and at least one second area where the subject is out of focus are automatically identified;
image processing is automatically applied on a first portion of the selected graphical object, wherein the first portion of the selected graphical object is not displayed in the at least one first area where the subject is in focus; and
image processing is automatically applied on a second portion of the selected graphical object, wherein the second portion of the selected graphical object is displayed in the at least one second area where the subject is out of focus.

* * * * *